(12) United States Patent
Urwin et al.

(10) Patent No.: US 11,058,991 B2
(45) Date of Patent: Jul. 13, 2021

(54) ADSORPTION DRYING UNIT

(71) Applicant: NEW YORK AIR BRAKE LLC, Watertown, NY (US)

(72) Inventors: Gavin L. Urwin, Tyne & Wear (GB); Jamie Lamb, Bishop Auckland (GB); Christopher T. Hoodless, Tyne & Wear (GB)

(73) Assignee: NEW YORK AIR BRAKE LLC

( * ) Notice: Subject to any disclaimer, the term of this patent is extended or adjusted under 35 U.S.C. 154(b) by 0 days.

(21) Appl. No.: 16/135,109

(22) Filed: Sep. 19, 2018

(65) Prior Publication Data
US 2019/0015777 A1 Jan. 17, 2019

Related U.S. Application Data

(63) Continuation of application No. PCT/GB2017/050723, filed on Mar. 16, 2017.

(30) Foreign Application Priority Data

Mar. 23, 2016 (GB) .................................. 1604937
Nov. 1, 2016 (GB) .................................. 1618395

(51) Int. Cl.
*B01D 53/047* (2006.01)
*B01D 53/26* (2006.01)
(Continued)

(52) U.S. Cl.
CPC ......... *B01D 53/261* (2013.01); *B01D 53/047* (2013.01); *B01D 53/0454* (2013.01);
(Continued)

(58) Field of Classification Search
CPC ... B60T 17/004; B01D 53/0454; B01D 53/04; B01D 53/047; B01D 53/261;
(Continued)

(56) References Cited

U.S. PATENT DOCUMENTS 3,448,561 A 6/1969 Seibert
4,247,311 A 1/1981 Seibert
(Continued)

FOREIGN PATENT DOCUMENTS

EP 1980312 A2 10/2008
EP 3000676 A1 3/2016
(Continued)

OTHER PUBLICATIONS

International Search Report and Written Opinion for PCT/GB2017/050723 dated Jun. 6, 2017.
(Continued)

*Primary Examiner* — Frank M Lawrence, Jr.
(74) *Attorney, Agent, or Firm* — Bond Schoeneck and King PLLC; David Nocilly

(57) ABSTRACT

A pressure swing adsorption drying unit which includes at least one of a sensor (46') for the ambient temperature to which the drying unit is exposed, and a sensor (46) for the temperature of the gas stream in the inlet line (2) to the unit, and the threshold value for the humidity of the gas stream in the outlet line (42) is determined dependent on the measured temperature.

9 Claims, 4 Drawing Sheets

(51) Int. Cl.
  *B60T 17/00* (2006.01)
  *B01D 53/04* (2006.01)
(52) U.S. Cl.
  CPC ...... *B60T 17/004* (2013.01); *B01D 2253/104* (2013.01); *B01D 2253/106* (2013.01); *B01D 2253/108* (2013.01); *B01D 2253/116* (2013.01); *B01D 2257/80* (2013.01); *B01D 2258/06* (2013.01); *B01D 2259/402* (2013.01); *B01D 2259/40009* (2013.01); *B01D 2259/4566* (2013.01)
(58) Field of Classification Search
  CPC ........ B01D 2253/104; B01D 2253/106; B01D 2253/108; B01D 2253/116; B01D 2257/80; B01D 2259/40009; B01D 2259/402; B01D 2259/4566
  USPC ........ 96/111, 112, 121, 143, 144; 95/10, 11, 95/14, 117, 121, 122; 34/80, 472, 473
  See application file for complete search history.

(56) References Cited

U.S. PATENT DOCUMENTS

| | | | | |
|---|---|---|---|---|
| 4,351,649 | A * | 9/1982 | Owens | B01D 53/261 96/110 |
| 4,361,649 | A | 11/1982 | Celmer | |
| 4,971,610 | A | 11/1990 | Henderson | |
| 5,199,964 | A * | 4/1993 | Graff | B01D 53/0454 95/123 |
| 6,767,390 | B2 | 7/2004 | Battershell | |
| 7,153,341 | B2 | 12/2006 | Hoyt | |
| 7,279,026 | B1 * | 10/2007 | Fresch | B01D 53/04 95/124 |
| 9,469,287 | B2 | 10/2016 | Wright | |
| 9,475,476 | B1 | 10/2016 | Wright | |
| 9,604,620 | B2 | 3/2017 | Wright | |
| 9,644,893 | B2 | 5/2017 | Wright | |
| 9,803,778 | B2 | 10/2017 | Wright | |
| 9,864,382 | B2 | 1/2018 | Wright | |
| 10,150,077 | B2 | 12/2018 | Wright | |
| 10,598,299 | B2 | 3/2020 | Wright | |
| 2002/0134234 | A1 * | 9/2002 | Kalbassi | B01D 53/0462 95/11 |
| 2003/0233941 | A1 * | 12/2003 | Battershell | B01D 53/0454 96/112 |
| 2012/0031273 | A1 | 2/2012 | Heer | |
| 2014/0223767 | A1 | 8/2014 | Arno | |
| 2014/0260967 | A1 * | 9/2014 | Gitschlag | B01D 53/261 95/41 |
| 2015/0217744 | A1 * | 8/2015 | Minato | B60T 13/662 96/116 |
| 2017/0095767 | A1 * | 4/2017 | Miehe | B01D 53/0454 |

FOREIGN PATENT DOCUMENTS

| | | |
|---|---|---|
| JP | 2000350916 | 12/2000 |
| JP | 2001004573 | 12/2001 |

OTHER PUBLICATIONS

Energy Savings from Dew Point Dependent Switching (DDS on heat regenerative desiccant compressed air driers) brochure. Copyright 1999.
Pneudri Energy Management Systems brochure. Copyright 1998.
The Lifecycle Cost of a Modern Air Supply System (LD-1000 Air Treatment Unit). Book extract pp. 1-4, 96-114. Copyright 2013.
The Lifecycle Cost of a Modern Air Supply System (LD-1000 Air Treatment Unit). Paper presented at the Air Break Association Annual Technical Conference Sep. 29-Oct. 1, 2013.
UK Patent Office search report for GB130937.1 dated Oct. 7, 2016.
Energy Savings from Dew Point Dependent Switching (DDS on heat regenerative desiccant compressed air driers)—dh paper presented at I Mech E conference—Apr. 1994.
Pneudri Energy Management Systems—dh brochure indicated as Copyright 1998.
The Lifecycle Cost of a Modern Air Supply System (LD-1000 Air Treatment Unit)—Book extract pp. 1-19, 1994.

* cited by examiner

ADSORPTION DRYING UNIT

CROSS REFERENCE TO RELATED APPLICATIONS

This application is a continuation of International Application No. PCT/GB2017/050723, filed Mar. 16, 2017, and which designated the United States; and which claims priority to Great Britain Application Nos. 1604937.1 filed Mar. 23, 2016 and 1618395.6 filed on Nov. 1, 2016, the disclosures of which are incorporated herein by reference.

BACKGROUND

This invention relates to an adsorption drying unit.

Known adsorption drying units have two (or more) chambers which contain adsorbent material. They are arranged so that a gas stream which is to be dried is supplied to one of the chambers (the "online chamber"). A proportion of the gas stream which leaves the online chamber after being dried is supplied to the other chamber, flowing through the other chamber to cause moisture which has been adsorbed to be desorbed. This proportion of the gas stream is referred to as the "purge stream" or "purge gas". The adsorbent material within the other chamber (the "offline chamber" or "regenerating chamber") is regenerated in this way. The gas stream is switched between the first and second chambers when the moisture content of the gas stream in the outlet line reaches a value (the "saturation threshold value") which indicates that the adsorbent material in the online chamber is not able readily to adsorb more moisture. Such drying units are referred to as pressure swing adsorption dryers.

Such known adsorption drying units have an inlet valve arrangement by which the gas stream flowing into the drying unit can be directed to flow into the online chamber and not into the regenerating chamber. The inlet valve arrangement can comprise separate first and second inlet valves (for example first and second 2:2 valves, especially solenoid actuated valves) associated with the first and second chamber respectively which can be opened and closed independently. The inlet valve arrangement can comprise a 3:2 valve (especially a solenoid actuated valve) which can switch between first and second positions in which the gas stream is directed to the first and second chambers respectively.

Each of the first and second chambers can have an exhaust valve which can be opened to allow the purge gas to flow out of the chamber which is being regenerated. The regeneration part of the operating cycle of the drying unit is controlled using the exhaust valves.

It is known to include a humidity sensor in the outlet line from a drying unit for generating a signal which is indicative of the humidity of the gas stream after it has flowed over the adsorbent material in the online chamber. The drying unit can be controlled dependent on the measured humidity. For example, if the adsorbent material in the regenerating chamber has been regenerated sufficiently and the humidity of the gas stream in the outlet line is less than a threshold value (which might be the saturation threshold value), indicating that the adsorbent material in the online chamber has capacity to adsorb more moisture, the exhaust valve in the regenerating chamber can be closed in order to stop the flow of the purge gas. This has the advantage of reducing the loss of dried gas which has flowed through the online chamber, helping to maximise the gas stream that is available to supply to a downstream application. The gas stream in the inlet line can be switched between the chambers when the humidity of the gas stream in the outlet line reaches the saturation threshold value.

The humidity sensor in the outlet line can be combined with a temperature sensor for measuring the humidity and the temperature of the gas stream in the outlet line. The dewpoint of the gas stream can be calculated from the measured humidity and temperature. The drying unit can be controlled dependent on the calculated dewpoint. For example, if the adsorbent material in the regenerating chamber has been regenerated sufficiently and the dewpoint of the gas stream in the outlet line is above a threshold value, indicating that the adsorbent material in the online chamber has capacity to adsorb more moisture, the exhaust valve in the regenerating chamber can be closed in order to stop the flow of the purge gas. This has the advantage of reducing the loss of dried gas which has flowed through the online chamber, helping to maximise the gas stream that is available to supply to a downstream application. The gas stream in the inlet line can be switched between the chambers when the dewpoint of the gas stream in the outlet line is less than the saturation threshold value.

A known adsorption drying unit is disclosed in EP-A-1980312.

SUMMARY

An adsorption drying unit is provided in which at least one of the ambient temperature to which the drying unit is exposed, and the temperature of the gas stream in the inlet line to the unit, is measured, and the threshold value for the humidity of the gas stream in the outlet line is determined dependent on the measured temperature.

The adsorption drying unit according to one aspect comprises:

a. first and second chambers, each containing adsorbent material, b. an inlet line for a gas stream to flow into the drying unit, c. an outlet line through which the gas stream can flow out of the drying unit to a downstream application after it has been dried by flowing through one of the first and second chambers, d. an inlet valve arrangement by which the gas stream flowing into the drying unit in the inlet line can be directed to flow into a selected one (the "online chamber") of the first and second chambers in order to be dried, e. a purge line through which a portion of the gas stream which has flowed through the online chamber can flow into the other one (the "regenerating chamber") of the first and second chambers to cause moisture which has been adsorbed by the adsorbent therein to be desorbed, f. an exhaust through which the portion of the gas stream which is supplied to one of the chambers to cause moisture to be desorbed can be discharged from the drying unit, g. an exhaust valve arrangement by which the first and second chambers can be connected selectively to the exhaust, h. a controller which can generate signals to cause the drying unit to switch between:

(i) a first operating condition in which the inlet valve arrangement is arranged to cause the gas stream flowing into the drying unit within the inlet line to flow into the first chamber, and the exhaust valve arrangement connects the second chamber to the exhaust, so that a portion of the gas stream which has flowed through the first chamber flows through the purge line into the second chamber, and from the second chamber to the exhaust, and (ii) a second operating condition in which the inlet valve arrangement is arranged to cause the gas stream flowing into the drying unit within the inlet line to flow into the second chamber, and the exhaust valve arrangement connects the first chamber to the exhaust, so that a portion of the gas stream which has flowed through the second chamber flows through the purge line into the first chamber, and from the first chamber to the exhaust, i. a moisture sensor in the outlet line for generating a signal which is indicative of the moisture content of the gas stream flowing in the outlet line, and which is supplied to the controller, and j. an inlet temperature sensor for generating a temperature signal which is indicative of at least one of (i) ambient temperature, and (ii) the temperature of the gas stream in the inlet line, the temperature signal being supplied to the controller, in which the controller causes the drying unit to switch between the first and second operating conditions dependent on the moisture content of the gas stream flowing in the outlet line and on the temperature which is sensed by the inlet temperature sensor.

The controller can be arranged to provide signals to the inlet valve arrangement to switch the gas stream in the inlet line between the first and second chambers, and to the exhaust valve arrangement (to open the exhaust from one of the chambers) sometime after it has provided a signal to the exhaust valve arrangement to close the exhaust from the chamber which has recently been regenerated. The time period between (a) providing the signal to the exhaust valve arrangement to close the exhaust from the chamber after it has been regenerated and (b) providing signals to the inlet valve arrangement and the exhaust valve arrangement can depend on the humidity of the gas stream in the outlet line and the temperature measured using the inlet temperature sensor. The signals to both the inlet valve arrangement and the exhaust valve arrangement will often be provided when the moisture content (especially the humidity or relative humidity or both) of the gas stream in the outlet line exceeds a predetermined value. The pre-determined moisture content, or the pre-determined value of the humidity (or relative humidity) can vary according to temperature which is measured using the inlet temperature sensor.

The adsorption drying unit that is provided has the advantage that the drying action of the unit can be controlled taking account of the ambient conditions to which the dried gas stream is exposed. The unit takes account of the fact that the risk of undesirable condensation of moisture in the gas stream downstream of the drying unit depends on both the humidity and the temperature of the gas stream when exposed to ambient conditions. The controller allows the operation of the drying unit to take account of the variation in the risk of condensation of moisture in the gas stream with ambient temperature, so that the drying action of the unit is reduced as the ambient temperature increases and the risk of condensation reduces. This can give rise to advantages in terms of a reduction in the cost of operating a drying unit. This is sometimes referred to as dewpoint suppression.

The signal that is provided by the inlet temperature sensor enables the drying action of the drying unit to take account of the risk of condensation of moisture from the gas stream downstream of the drying unit. The signal can be generated by the inlet temperature sensor by measuring the ambient temperature generally surrounding the drying unit. The signal can be generated by measuring ambient temperature at a location which is remote from the drying unit, for example at which it is particularly desirable to minimise the risk of condensation. Measuring the ambient temperature remotely from the drying unit can be appropriate if the temperature at the remote location is different from the temperature to which the drying unit is itself directly exposed.

The signal that is provided by the inlet temperature sensor can be generated by measuring the temperature of the gas stream which is supplied to the drying unit for drying, for example measuring the temperature of the gas stream in the inlet line. This gas will frequently have been exposed to the same ambient conditions prior to supply to the drying unit as the conditions to which the gas stream will be exposed when supplied to a downstream application.

The signal from the controller to disconnect the regenerating chamber from the exhaust (for example by closing an exhaust valve associated with the regenerating chamber) can be generated when the adsorbent material in the regenerating chamber has regenerated. This can take place after exposure to the purge gas for a pre-determined period of time. The period of time might depend on factors such as the amount of adsorbent material in the chambers, the rate of flow of the purge gas, the operating temperature of the unit during the regeneration phase and so on. It might take place in response to a signal to the controller from a sensor in the exhaust for moisture in the purge gas which detects that the moisture content in the purge gas is less than a predetermined value. Factors affecting the control of the regeneration phase of pressure swing adsorption apparatus are well known.

The signal from the controller to switch the inlet valve arrangement to cause the gas stream in the inlet line to be switched between the first and second chambers can be generated when it is determined that the adsorbent material in the online chamber has adsorbed so much moisture that it is no longer able to dry the gas stream sufficiently. This is assessed with reference to data from the moisture sensor in the outlet line: the moisture sensor can provide an indication that the moisture content (especially the humidity or relative humidity) of the gas stream in the outlet line is too high, indicating that the adsorbent material is no longer able to remove enough moisture. The assessment also takes account of temperature data from the inlet temperature sensor because the tendency of moisture in a gas stream that is supplied from the drying unit to condense depends on the temperature to which the gas stream is exposed. Accordingly, if the temperature which is sensed by the inlet temperature sensor is relatively high, the generation of the signal from the controller to the inlet valve arrangement, which causes the gas stream in the inlet line to be switched between the first and second chambers, can be generated when the moisture content of the gas stream in the outlet line has been allowed to reach a higher level.

The controller might generate appropriate signals to cause the drying unit to switch between the first and second operating conditions when the adsorbent material in the regenerating chamber has been regenerated.

The controller can be arranged to generate the signals discussed above for the inlet and exhaust valve arrangements dependent on the adsorption characteristics of the adsorbent material in the chambers. For example, the signals can take account of the variation in the adsorption behaviour of the adsorbent material with temperature, for example in devices in which the adsorption behaviour is optimal across a limited temperature range, and less than optimal above that range or below that range or both. Such variation can give rise to a reduction in the efficiency of the adsorption process when the temperature of the gas stream flowing through the adsorption chambers is such that the adsorption behaviour of the adsorbent material is less than optimal. In some situations, it can be appropriate to operate the drying unit in such a way that the gas stream leaving the drying unit in the outlet line is less dry than can sometimes be achieved using the unit (as measured using the moisture sensor) because this can lead to improvements in the efficiency with which the unit is operated, for example as measured in terms of energy losses due to regeneration of the chambers. Identifying the circumstances in which the drying unit can be operated in this way is possible based on signals from the moisture sensor or the inlet temperature sensor or both of the moisture and inlet temperature sensors, in particular using signals from the inlet temperature sensor which can provide an indication of variations in the adsorption characteristics of the adsorption material with temperature. It is an advantage of the drying unit that it can make possible improvements in the operating efficiency of a drying unit taking account of variations in the adsorption characteristics of the adsorbent material in the first and second chambers, taking advantage of less demanding applications for the output gas stream.

The moisture sensor is used to generate a signal which is indicative of the moisture content of the gas stream flowing in the outlet line, especially the humidity or relative humidity of the gas stream. A moisture content signal can be used to estimate the relative humidity of the gas stream. The relative humidity is the amount of moisture in the gas stream (which could be measured as the mass of moisture or as the moisture vapour pressure) divided by the maximum amount of moisture that could exist in the gas stream at a specific temperature. The relative humidity is therefore the ratio of the partial pressure of water vapour in the gas stream to the equilibrium vapour pressure of water at the same temperature. Relative humidity depends on the temperature and the pressure of the gas stream.

The operation of the drying unit can be understood in terms of the dewpoint (or dewpoint temperature) of the gas stream. The dewpoint is a measure of the moisture content of the gas stream, being the temperature to which the gas stream must be cooled to reach saturation (assuming air pressure and moisture content are constant). A higher dewpoint is indicative of a higher moisture content in the gas stream. The dewpoint is therefore the temperature at which moisture will condense from the gas stream as the temperature of the gas stream falls. The dewpoint temperature is always less than the actual temperature of the gas stream because the relative humidity cannot exceed 100%. A high relative humidity means that the dewpoint is closer to the actual temperature of the gas stream. A relative humidity of 100% means that the dewpoint is equal to the actual temperature and that the gas stream is saturated with water.

The dewpoint Tdp can be calculated approximately using the formula:

$$T_{dp} \approx T - \frac{100 - RH}{5}$$

in which T is the temperature of the gas stream and RH is its relative humidity.

The adsorption drying unit can include a temperature sensor in the outlet line and a processor which is programmed to determine the dewpoint of the gas stream in the outlet line based on signals from the moisture sensor and the outlet line temperature sensor. The controller can include the processor. The moisture sensor, the outlet line temperature sensor and the processor can be provided by a modular dewpoint sensor component in or associated with the outlet line (so that the sensors generate signals indicative of the humidity and temperature of the gas stream in the outlet line). The dewpoint sensor component can then generate a dewpoint signal which is indicative of the dewpoint of the gas stream in the outlet line and which is supplied to the controller.

Optionally, when the first chamber is operating in the online portion of the operating cycle and the second chamber is operating in the regenerating portion of the operating cycle, the controller is programmed to switch the second chamber to an offline portion of the operating cycle in which it is isolated from both the gas stream in the inlet line and a purge gas stream from the online chamber, while maintaining the first chamber in the online portion of the operating cycle, in response to a determination at the end of the regenerating portion of the operating cycle of the second chamber that the suppression of the dewpoint of the gas stream in the outlet line relative to that of the gas stream in the inlet line is at least equal to a threshold value.

Optionally, when the first chamber is operating in the online portion of the operating cycle and the second chamber is operating in the regenerating portion of the operating cycle, the controller is programmed to switch the second chamber to the online portion of the operating cycle and to switch the first chamber to the regenerating portion of the operating cycle in response to a determination that the suppression of the dewpoint of the gas stream in the outlet line relative to that of the gas stream in the inlet line is less than a threshold value.

The provision of the inlet temperature sensor enables dewpoint of the gas stream in the inlet line to be estimated if it is assumed that the gas stream in the inlet line is fully saturated. The drying unit can be operated to reduce the dewpoint of the gas stream by a target amount so that the difference between dewpoint of the gas stream in the inlet line and the dewpoint of the gas stream in the outlet line is at least about 20° C., for example at least about 25° C., or at least about 30° C., or at least about 35° C., or 40° C. or more.

The suppression of the dewpoint of the gas stream that is achieved using the drying unit can be varied. For example, the dewpoint depression can be varied dependent on the temperature that is measured using the inlet temperature sensor. The dewpoint depression can take account of variations in the adsorption characteristics of the adsorbent material with temperature which might, for example be greatest within a particular range of temperatures and drop off outside that temperature range. The adsorption drying unit therefore makes it possible to take account of variations in the adsorption characteristics of the adsorbent material with temperature in the control over the switching of the gas stream between the online and regeneration phases of the operating cycle. The drying unit might be arranged to achieve a smaller dewpoint suppression when the operating conditions of the unit (especially the operating temperature) are such that the adsorption capacity (or another adsorption characteristic) of the adsorbent material is limited.

An example of an adsorbent material which can be provided in the first and second chambers is a desiccant material. Examples of suitable desiccant materials include activated aluminas, silica gels and appropriately selected molecular sieves. Another example of an adsorbent material is a drying membrane. When the adsorption capacity of available adsorbent materials varies with temperature, it can be desirable to select a material which has an appropriate adsorption capacity over the operating temperature range of the drying unit. It might be appropriate to use more than one adsorbent materials in order for the drying unit to have an appropriate adsorption capacity across the operating temperature range.

Operation of the drying unit can therefore take account of variations in one or both of (a) the rate of flow of the gas stream in the inlet line, and (b) the ambient temperature, with the possibility of ceasing the supply of a portion of the gas stream which has been dried in the online chamber to the regenerating chamber while the online chamber continues to treat the gas stream which is supplied to the drying unit through the inlet line. Operation of the drying unit in this way is feasible when the moisture content of the gas stream in the outlet line has been reduced sufficiently to satisfy the requirements of a downstream application, taking account of the ambient temperature. For example, the drying unit is able to operate for a longer period without switching the online chamber between the first and second chambers when operated at higher temperatures.

The inlet valve arrangement can comprise separate first and second inlet valves (for example first and second 2:2 valves) associated with the first and second chamber respectively which can be opened and closed independently. The inlet valve arrangement can comprise a 3:2 valve which can switch between first and second positions in which the gas stream is directed to the first and second chambers respectively.

The purge line can be arranged so that the volume of the dried gas stream which has been dried in the online chamber which is supplied to the other chamber to regenerate the adsorbent material is not more than about 20% of the total volume of the dried gas stream, for example, not more than about 10%. The portion of the dried gas stream which is supplied to the regenerating chamber can be controlled by means of a flow restrictor in the purge line.

The flow of a purge gas through the chambers can be controlled by means of the exhaust valves, so that the exhaust valve for the chamber which requires regeneration is open, and the exhaust value for the chamber which is online is closed.

The outlet line can include at least one check valve which is arranged to open when the pressure in the outlet line exceeds a threshold value. A check valve can be provided at or close to the outlet from each of the first and second chambers. Check valves can help to control the direction of flow of gas through the chambers.

The drying unit might have a common exhaust through which purge gas from each of the first and second chambers is discharged. It is also envisaged that each of the first and second chambers might have separate exhausts through which gas is discharged.

Purge gas can be discharged to atmosphere from the exhaust when the purge gas does not contain any harmful components.

Optionally, the exhaust valve arrangement comprises:
 a. a first exhaust valve associated with the first chamber through which the portion of the gas stream which is supplied to the first chamber to cause moisture to be desorbed can be discharged from the first chamber, and
 b. a second exhaust valve associated with the second chamber through which the portion of the gas stream which is supplied to the second chamber to cause moisture to be desorbed can be discharged from the second chamber.

For example, each of the first and second exhaust valves can be a 2:2 valve, especially a solenoid actuated valve.

The exhaust valve arrangement might comprise a 3:3 valve having a first position in which the first chamber is connected to an exhaust, a second position in which the second chamber is connected to an exhaust, and a third position (which might be between the first and second positions) in which neither the first chamber nor the second chamber is connected to an exhaust.

The drying unit can include an outlet valve arrangement for controlling flow of the gas stream in the outlet line. The outlet valve arrangement might include a first outlet valve for controlling flow of the gas stream in an outlet line from the first chamber and a second outlet valve for controlling flow of gas in an outlet line from the second chamber. Each of the outlet valves can be a check valve which allows flow of the gas stream in a direction from the chamber to a downstream application and prevents flow of the gas stream in the opposite direction towards the chamber.

A flow restrictor valve can be provided in a bypass line which allows the purge gas to flow from the online chamber to the regenerating chamber, bypassing an outlet check valve associated with the regenerating chamber. A bypass line can be provided associated with each of the first and second outlet valves. Alternatively, a single bypass line can be provided, extending between the outlets from the first and second cylinders.

The drying unit can be used with a pre-treatment unit for treating the gas stream before it is admitted to one or other of the first and second chambers. The pre-treatment unit can include a separator component for separating bulk water (or other liquid) from the gas stream. It can include one or more components for separating aerosol droplets which are entrained in the gas stream. Suitable components for separating aerosol droplets from the gas stream include coalescing filters.

A method of operating an adsorption drying unit for a gas Stream is also provided, in which the drying unit which comprises first and second drying chambers, each containing an adsorbent material and each of which can be switched between online, offline and regeneration portions of an operating cycle, and in which the method includes the step of causing the at least one of the chambers to switch from one of the portions of the operating cycle to another of the portions of the operating cycle dependent on (a) the moisture content of the gas stream in the outlet line from the online chamber and (b) at least one of the ambient temperature and the temperature of the gas stream in the inlet line to the drying unit.

In the method, the first chamber can be operating in the online portion of the operating cycle and the second chamber can be operating in the regenerating portion of the operating cycle. The method can then involve switching the second chamber to an offline portion of the operating cycle in which it is isolated from both the gas stream in the inlet line and a purge gas stream from the online chamber, while maintaining the first chamber in the online portion of the operating cycle, in response to a determination at the end of the regenerating portion of the operating cycle of the second chamber that the suppression of the dewpoint of the gas stream in the outlet line relative to that of the gas stream in the inlet line is at least equal to a threshold value. Alternatively or in addition, the method can also involve switching the second chamber to the online portion of the operating cycle and switching the first chamber to the regenerating portion of the operating cycle in response to a determination that the suppression of the dewpoint of the gas stream in the outlet line relative to that of the gas stream in the inlet line is less than a threshold value.

The threshold value can be about 20° C., for example about 25° C., or about 30° C., or about 35° C., or 40° C. or more.

The threshold value can depend on one or both of the ambient temperature and the temperature of the gas stream in the inlet line to the drying unit.

The method can make use of a drying unit having any of the features of the drying unit.

The adsorption drying unit is useful in applications where it is desirable to control the moisture content of compressed air. An example of such an application is in lines used for compressed air in a vehicle brake system, for example in a railway vehicle or in a road going vehicle.

BRIEF DESCRIPTION OF THE DRAWINGS

Embodiments of the drying unit are described below by way of example with reference to the accompanying drawings, in which.

DETAILED DESCRIPTION OF THE PREFERRED EMBODIMENTS

Figure 1:
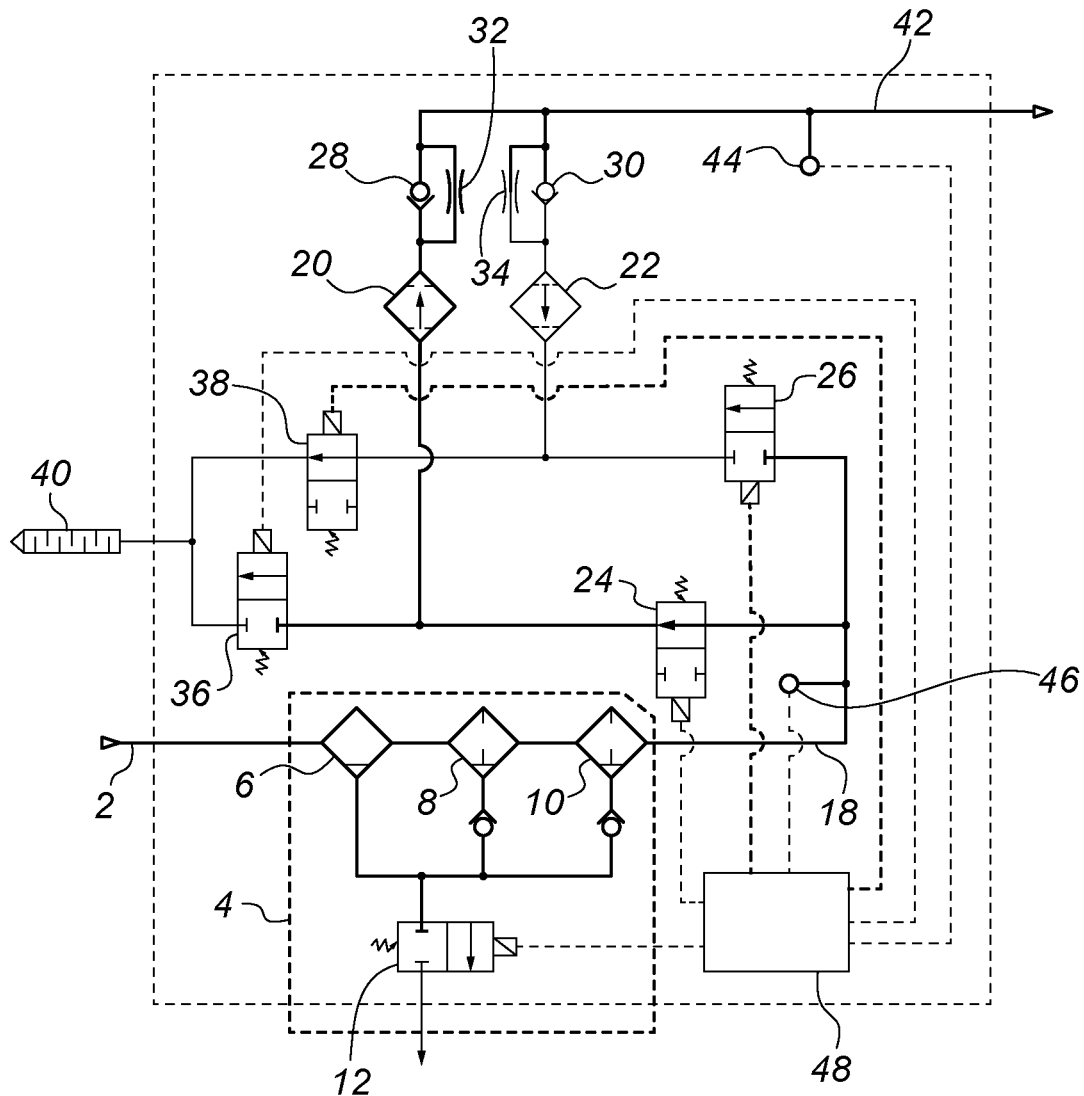
FIG. 1 is a schematic representation of a first drying unit.

Referring to the drawings, FIG. 1 shows a system which can be used to dry a gas stream which includes an adsorption drying unit. The system includes a system inlet line 2 through which a gas stream is admitted to the system.

The system includes a pre-treatment unit 4 which can be used to remove liquid water from the gas stream. The pre-treatment unit includes a bulk water (or other liquid) separator 6, and first and second coalescing separators 8, 10 which can be used to remove liquid in the form of aerosol droplets. The second coalescing separator can be configured to collect droplets with a smaller size compared with the droplets which are collected by the first coalescing filter. The pre-treatment unit includes a drain valve 12 through which liquid which is collected by means of the separators is discharged from the system. Suitable separator components are available from the domnick hunter division of Parker Hannifin Corporation under the trade mark OIL-X The adsorption drying unit includes first and second chambers 20, 22. An inlet line 18 extends between the pre-treatment unit 4 and the first and second chambers. Each of the chambers contains an adsorbent material such as an activated alumina, a silica gel or an appropriately selected molecular sieve. The drying unit includes an inlet valve arrangement by which a gas stream from the pre-treatment unit can be directed to the first chamber 20 or the second chamber 22. In the system shown in the drawings, the inlet valve arrangement comprises a first inlet valve 24 positioned upstream of the first chamber, and a second inlet valve 26 positioned upstream of the second chamber. Each of the first and second inlet valves 24, 26 is a solenoid actuated 2:2 valve.

An outlet check valve 28, 30 is provided in the outlet from each of the first and second chambers 20, 22. Each of the check valves allows flow of gas out of its respective chamber in a flow direction from the drying unit inlet to the drying unit outlet. Each of the check valves has an associated by-pass throttle valve 32, 34 which allows a small flow of gas past its respective outlet check valve when the check valve is closed.

A first exhaust valve 36 is provided between the first inlet valve 24 and the first chamber 20. A second exhaust valve 38 is provided between the second inlet valve 26 and the second chamber 22. Each of the first and second exhaust valves is a solenoid actuated 2:2 valve. When either of the exhaust valves is open, it allows gas flow between its respective chamber and atmosphere through an exhaust 40.

Treated gas from the chambers is discharged from the drying unit to a downstream application through an outlet line 42. The outlet line 42 includes a sensor arrangement 44 which includes a moisture sensor and a temperature sensor. The sensor arrangement provides signals indicative of the humidity and the temperature of the gas stream in the outlet line. The signals can be used to calculate one or both of the relative humidity and the dewpoint of the gas stream in the outlet line.

The drying unit includes an inlet line temperature sensor 46 which provides a signal indicative of concerning the temperature of the gas stream which is to be treated in the drying unit. The inline line temperature sensor is shown in the drawings positioned in the inlet line 18, between the pre-treatment unit 4 and the first and second chambers. It could be provided in the system inlet line, upstream of the pre-treatment unit 4. Information from the inlet line temperature sensor 46 concerning the temperature of the gas stream which is to be treated in the drying unit can be used to calculate the dewpoint of the gas stream if it is assumed that the gas stream which is to be treated in the unit is completely saturated with water.

The drying unit includes a controller 48. The controller receives signals from sensors in the system, including the moisture and temperature signals sensor arrangement 44, and the temperature signal from inlet line temperature sensor 46.

The controller 48 can generate signals:
- to move the drain valve 12 between its open and closed positions.
- to move each of the first and second inlet valves 24, 26 between their open and closed positions.
- to move each of the first and second exhaust valves 36, 38 between their open and closed positions.

In use, a gas stream is supplied to the system through the system inlet line 2. It flows through the pre-treatment unit 4 (if provided) to remove bulk liquid and liquid in the form of aerosol droplets which are discharged from the system through the drain valve 12.

The pre-treated gas stream flows form the pre-treatment unit 4 to the inlet valve arrangement provided by the first and second inlet valves 24, 26 through the inlet line 18. The temperature of the gas stream in the inlet line is monitored using the inlet line temperature sensor 46.

In a first operating mode (as shown in FIG. 1), signals are provided by the controller 48 to open the first inlet valve 24 and to close the second inlet valve 26, and to close the first exhaust valve 36 and to open the second exhaust valve 38. The gas stream flows through the first inlet valve 24 into the first chamber 20 so that it flows over the adsorbent material in the first chamber, causing moisture in the gas stream to be adsorbed. The first chamber is then the "online chamber".

The gas stream which has flowed over the adsorbent material in the first chamber 20 is able to flow out of the first chamber into the outlet line 42, past the first one way outlet check valve 28. A portion of the gas stream which has flowed over the adsorbent material in the first chamber is able to flow through the by-pass throttle valve 34 which is associated with the second one-way outlet check valve 30, into and through the second chamber 22. The second chamber is then the "regenerating chamber". This portion of the gas stream is referred to as the purge stream or purge gas. It causes moisture which has been adsorbed on the adsorbent material in the chambers to be desorbed. The purge gas flowing through the second chamber is discharged from the drying unit through the second exhaust valve 38 and the exhaust 40.

The flow of the purge gas from the outlet line 42 through the second chamber 30 is controlled by operation of the second exhaust valve. The purge gas is allowed to flow through the second chamber until the adsorbent material in the second chamber has been regenerated sufficiently for it then to be capable of being reused to remove moisture from a gas stream. The exhaust valve can then be closed to shut off the flow of the purge gas. Frequently, the purge gas can be allowed to flow on a time control basis because the step of regenerating the adsorbent material is generally controlled and predictable. However, it might be preferable for some applications to include a sensor to generate a signal which is indicative of the moisture content in the adsorbent in a regenerating chamber, with the exhaust valve being closed when the moisture content has dropped sufficiently.

The flow of the gas stream through the online chamber continues until the adsorbent material in that chamber has adsorbed so much moisture that the gas stream leaving the chamber contains more moisture than can be accommodated in the downstream application. The moisture content of the gas stream in the outlet line 42 is monitored using the moisture and temperature sensors within the sensor arrangement 44 and the inlet line temperature sensor 46. Signals from these sensors are supplied to the controller 48. The first and second chambers are switched between online and regenerating modes by switching each of the first and second inlet valves between their open and closed positions. This happens when it is determined that the depression of the dewpoint of the gas stream in the outlet line 42 compared with the dewpoint of the gas stream in the inlet line 18 is less than a pre-determined value.

Figure 2:
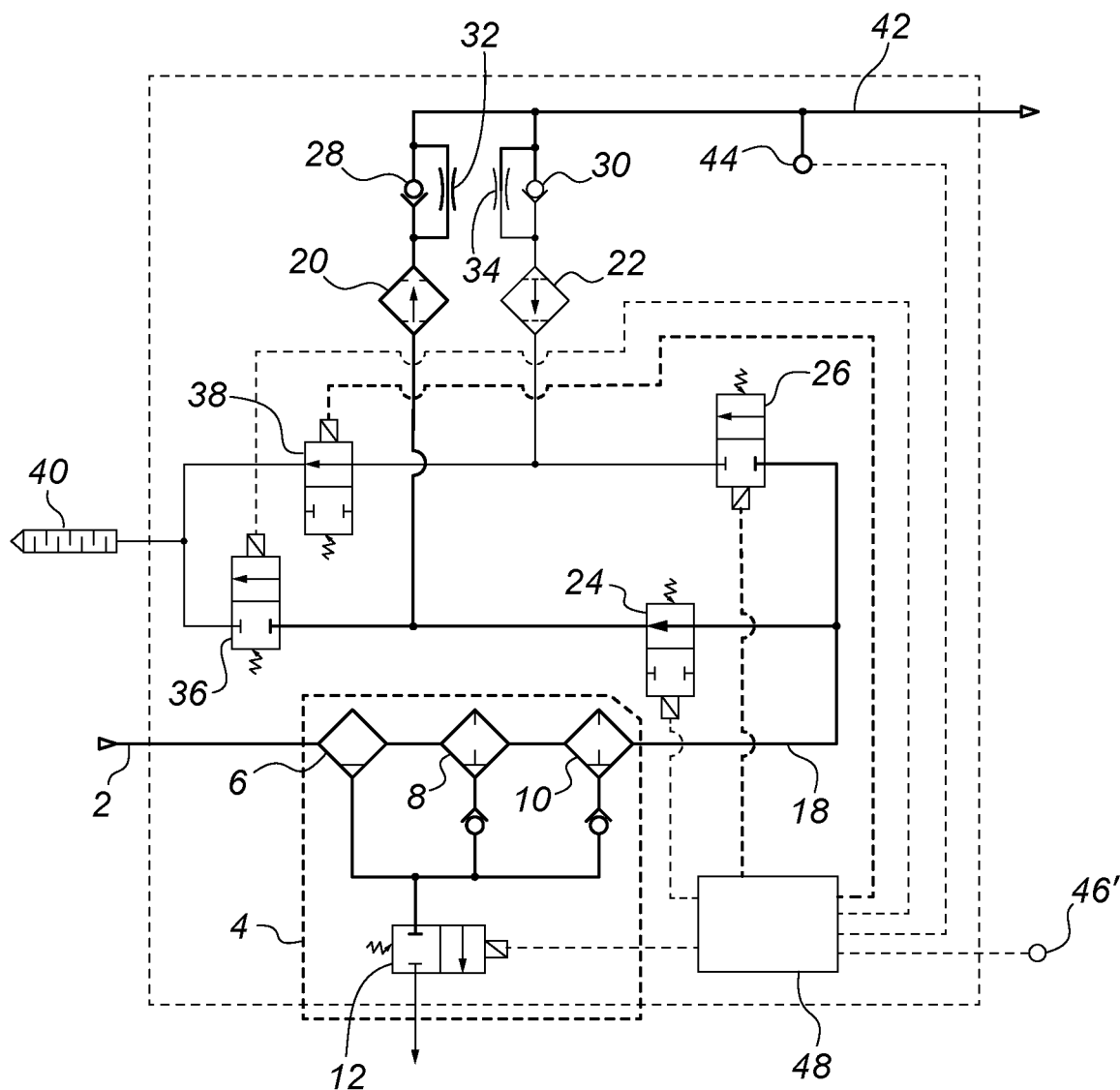
FIG. 2 is a schematic representation of a second drying unit.

FIG. 2 shows another adsorption drying unit whose components are similar to those of the drying unit shown in FIG. 1 and which is operated in a similar way. The drying unit shown in FIG. 2 differs from that shown in FIG. 1 in that it includes an ambient temperature sensor 46' for measuring the temperature of the atmosphere surrounding the drying unit. The ambient temperature 46' provides a signal indicative of concerning the temperature of the gas stream which is to be treated in the drying unit. The signal from the ambient temperature sensor 46' of the drying unit shown in FIG. 2 is processed by the controller 48 in the same way as temperature data from the inlet line temperature sensor 46 in the drying unit shown in FIG. 1.

Figure 3:
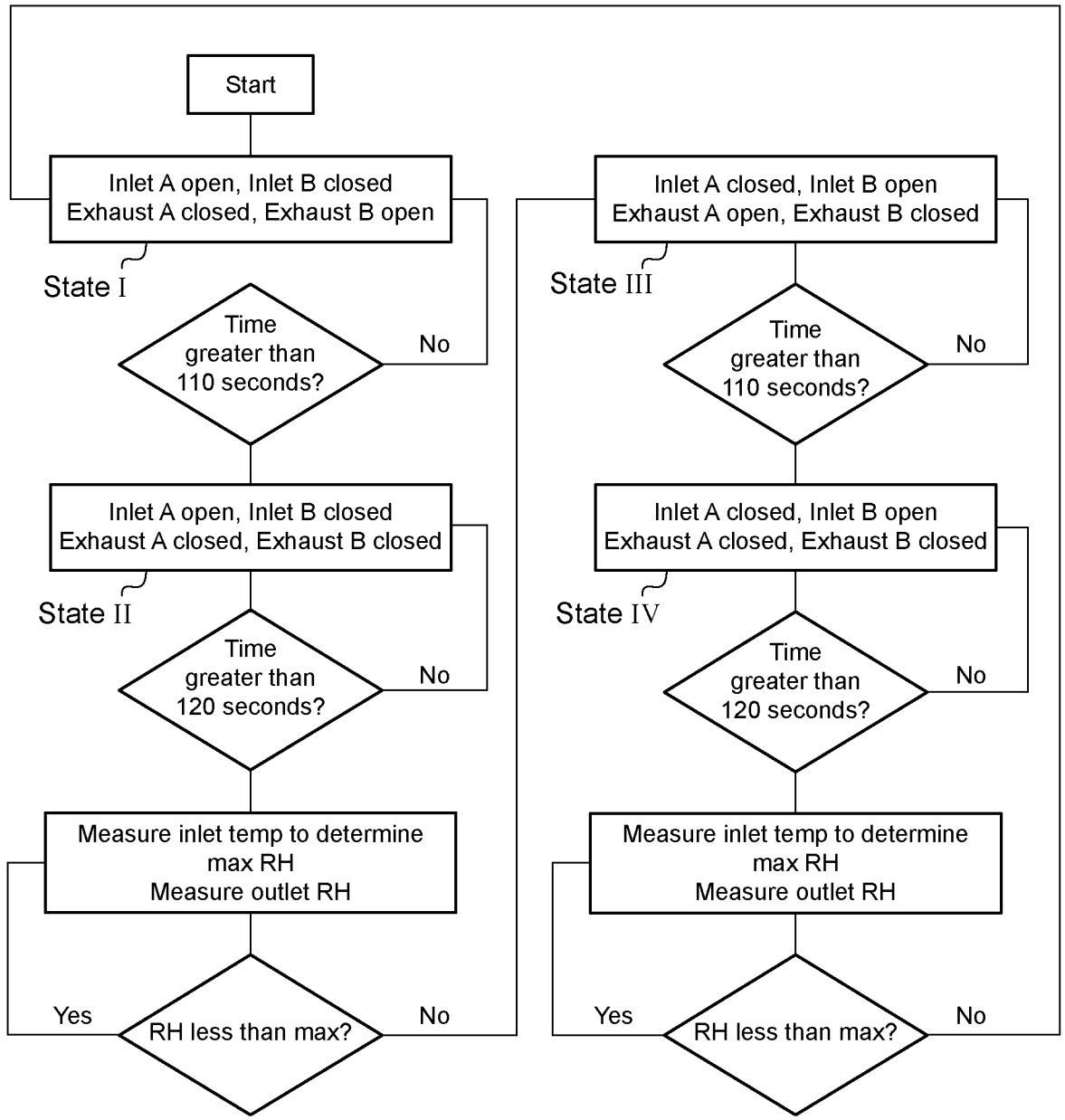
FIG. 3 is a flow chart which shows schematically how a drying unit such as a drying unit as described below with reference to FIG. 1 or FIG. 2 or each of FIGS. 1 and 2 can be programmed to operate.

FIG. 3 is a flow chart with details of steps in the operation of a drying unit which has a first chamber A and a second chamber B, each containing adsorbent material. Each of the chambers has an inlet for a gas stream which is to be dried and an outlet through which a dried gas stream is discharged to flow through an outlet line to a downstream application. A purge line with at least one flow restrictor in it allows a purge flow of gas to flow between the outlets of the first and second chambers. There is an exhaust through which gas in each of the chambers can be exhausted, from the inlet ends of the chambers. The flow of gas through the exhausts is controlled by exhaust valves.

As shown in FIG. 3, chamber A is online at when the drying unit is started. This means that inlet A to chamber A is open and inlet B to chamber B is closed. Exhaust A from chamber A is closed and exhaust B from chamber B is open. A gas stream supplied to chamber A through inlet A passes over the adsorbent material in chamber A which dries the gas stream. A portion of the gas stream which leaves chamber A through the outlet from chamber A passes through the purge line with the flow restrictor. It flows into chamber B from the purge line, through chamber B where it causes water of other fluid which has been adsorbed to be desorbed. The adsorbent material in chamber B is regenerated as a result of the passage through it of the purge gas. The purge gas leaves chamber B through exhaust B. The state of the drying unit when it is started (State I) is therefore:

Inlet A open
Inlet B closed
Exhaust A closed
Exhaust B open

This initial state continues for a period which is sufficient to cause sufficient fluid to be desorbed from the adsorbent material in chamber B for that material then to be ready to be used to dry the gas stream which is supplied to the inlet line. In a particular example, this period might be 110 seconds. Exhaust B is then closed which stops the flow of the purge gas out of chamber B. However, the supply of purge gas from chamber A to chamber B continues. The resulting state of the drying unit (State II) is therefore:

Inlet A open
Inlet B closed
Exhaust A closed
Exhaust B closed

The supply of the purge gas from chamber A to chamber B can be continued for a minimum fixed period which will usually be sufficient for the pressure in chamber B to equal that in chamber A. In a particular example, this period might be 10 seconds.

The next change in the operating state of the unit takes place when it is determined that the quantity of fluid that has been adsorbed by the adsorbent material in chamber A is such that the moisture (especially the relative humidity) of the gas stream passing that is discharged from chamber A through the outlet exceeds a threshold value. The change in the operating state of the unit involves switching the gas stream in the inlet line from chamber A to chamber B, and opening exhaust A. The resulting state of the drying unit (State III) is therefore:

Inlet A closed
Inlet B open
Exhaust A open
Exhaust B closed

This state of the drying unit (State III) is therefore the reverse of the initial operating state (State I) described above.

The threshold value of the relative humidity depends on the temperature which is measured using an inlet temperature sensor which generates a temperatures signal indicative of at least one of (i) ambient temperature and (ii) the temperature of the gas stream in the inlet line. The threshold relative humidity might be varied taking account of factors such as a variation in the adsorption characteristics of the adsorption material with temperature, for example the drying unit might be arranged to achieve a smaller dewpoint suppression when the operating conditions of the unit (especially the operating temperature) are such that the adsorption capacity (or another adsorption characteristic) of the adsorbent material is limited.

The drying unit has an additional State IV which is the counterpart when chamber B is online and chamber A is being regenerated to State II described above when chamber A is online and chamber B is being regenerated.

This operation of the drying unit gives the possibility of prolonging State II (and State IV), beyond 120 seconds in the particular example being discussed, and therefore of the duration of the operating cycle overall. This means that the number of switches of the gas stream between the inlets of the two chambers can be reduced. The drying unit provides the possibility of improved operating efficiencies because purge gas is not discharged from the system while it is in State II (or State IV).

EXAMPLE

Figure 4:
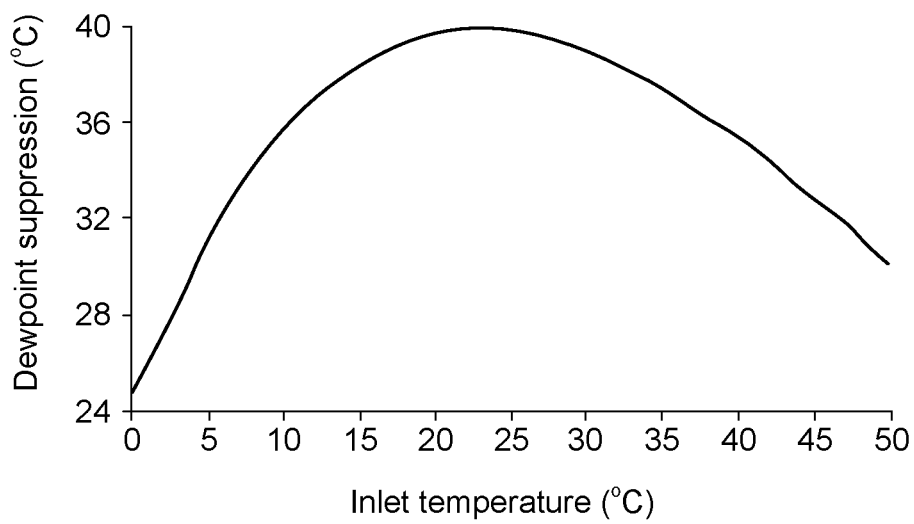
FIG. 4 shows how the target dewpoint suppression of a drying unit which makes use of an alumina adsorption material varies with the temperature of the gas stream in the inline line.

FIG. 4 shows schematically how the required suppression of dewpoint of a gas stream might vary with temperature in an example of a drying unit in which the adsorbent material in the first and second chambers is an activated alumina. This takes account of the variation in the ability of adsorbent material to adsorb water, and also the risk of condensation of moisture contained in the gas stream when supplied to a downstream application.

Figure 5:
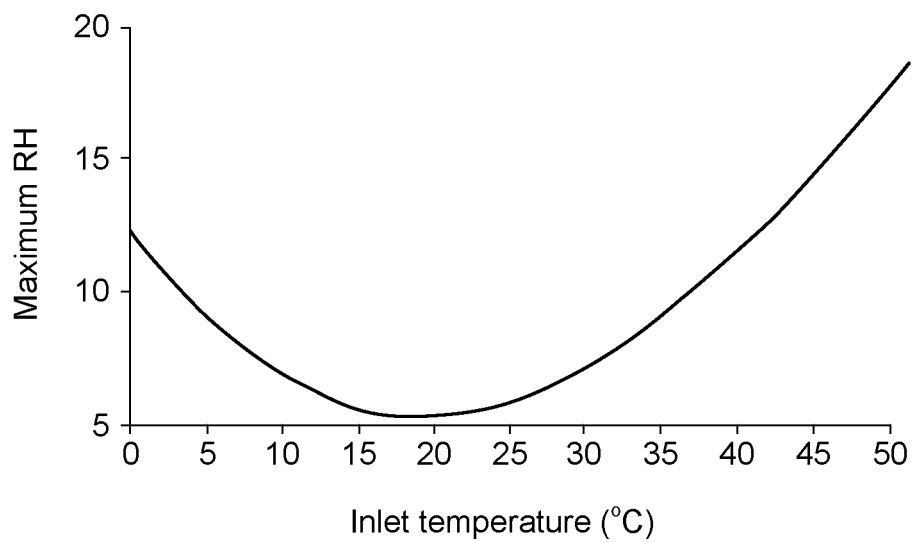
FIG. 5 shows how the threshold relative humidity in a drying unit varies with temperature which is designed to provide a target dewpoint suppression in a gas stream.

FIG. 5 shows schematically how the threshold (or maximum) relative humidity value varies with temperature in a drying unit which is designed to provide dewpoint suppression in a gas stream as shown in FIG. 4.

The invention claimed is:

1. An adsorption drying unit, comprising:
   a. first and second chambers, each containing adsorbent material,
   b. line for a gas stream to flow into the drying unit,
   c. an outlet line through which the gas stream can flow out of the drying unit to a downstream application after it has been dried by flowing through one of the first and second chambers,
   d. an inlet valve arrangement by which the gas stream flowing into the drying unit in the inlet line can be directed to flow into a selected one of the first and second chambers in order to be dried,
   e. a purge line through which a portion of the gas stream which has flowed through an online chamber can flow into the other one of the first and second chambers to cause moisture which has been adsorbed by the adsorbent therein to be desorbed,
   f. an exhaust through which the portion of the gas stream which is supplied to one of the chambers to cause moisture to be desorbed can be discharged from the drying unit,
   g. an exhaust valve arrangement by which the first and second chambers can be connected selectively to the exhaust,
   h. a controller which can generate signals to cause the drying unit to switch between:
      (i) a first operating condition in which the inlet valve arrangement is arranged to cause the gas stream flowing into the drying unit within the inlet line to flow into the first chamber, and the exhaust valve arrangement connects the second chamber to the exhaust, so that a portion of the gas stream which has flowed through the first chamber flows through the purge line into the second chamber, and from the second chamber to the exhaust, and
      (ii) a second operating condition in which the inlet valve arrangement is arranged to cause the gas stream flowing into the drying unit within the inlet line to flow into the second chamber, and the exhaust valve arrangement connects the first chamber to the exhaust, so that a portion of the gas stream which has flowed through the second chamber flows through the purge line into the first chamber, and from the first chamber to the exhaust,
   i. a moisture sensor in the outlet line for generating a signal which is indicative of the moisture content of the gas stream flowing in the outlet line, and which is supplied to the controller,
   j. an inlet temperature sensor for generating a temperature signal which is indicative of at least one of (i) ambient temperature, and (ii) the temperature of the gas stream in the inlet line, the temperature signal being supplied to the controller, in which the controller causes the drying unit to switch between the first and second operating conditions dependent on the moisture content of the gas stream flowing in the outlet line and on the temperature which is sensed by the inlet temperature sensor, and
   k. a temperature sensor in the outlet line and a processor which is programmed to determine the dewpoint of the gas stream in the outlet line based on signals from the moisture sensor and the outlet line temperature sensor;
   wherein when the first chamber is operating in the online portion of the operating cycle and the second chamber is operating in a regenerating portion of an operating cycle, the controller is programmed to switch the second chamber to an offline portion of the operating cycle in which it is isolated from both the gas stream in the inlet line and a purge gas stream from the online chamber, while maintaining the first chamber in the online portion of the operating cycle, in response to a determination at the end of the regenerating portion of the operating cycle of the second chamber that a suppression of the dewpoint of the gas stream in the outlet line relative to that of the gas stream in the inlet line is at least equal to a threshold value.

2. An adsorption drying unit as claimed in claim 1, in which, when the first chamber is operating in the online portion of the operating cycle and the second chamber is operating in the regenerating portion of the operating cycle, the controller is programmed to switch the second chamber to the online portion of the operating cycle and to switch the first chamber to the regenerating portion of the operating cycle in response to a determination that the suppression of the dewpoint of the gas stream in the outlet line relative to that of the gas stream in the inlet line is less than a threshold value.

3. An adsorption drying unit as claimed in claim 1, in which the controller includes the processor.

4. An adsorption drying unit as claimed in claim 1, in which the moisture sensor, the outlet line temperature sensor and the processor are provided by a modular dewpoint sensor component in or associated with the outlet line, and the dewpoint sensor component generates a dewpoint signal which is indicative of the dewpoint of the gas stream in the outlet line and which is supplied to the controller.

5. An adsorption drying unit as claimed in claim 1, in which the exhaust valve arrangement comprises:

a. a first exhaust valve associated with the first chamber through which the portion of the gas stream which is supplied to the first chamber to cause moisture to be desorbed can be discharged from the first chamber, and
  b. a second exhaust valve associated with the second chamber through which the portion of the gas stream which is supplied to the second chamber to cause moisture to be desorbed can be discharged from the second chamber.

6. An adsorption drying unit as claimed in claim 1, in which inlet valve arrangement comprises a first inlet valve associated with the first chamber and a second inlet valve associated with the second chamber, and in which the first and second inlet valves can be opened and closed independently of one another.

7. An adsorption drying unit as claimed in claim 1, in which the inlet temperature sensor measures the temperature of the gas stream in the inlet line.

8. An adsorption drying unit as in claim 1, in which the inlet temperature sensor measures the temperature of the atmosphere surrounding the drying unit.

9. A method of operating an adsorption drying unit for a gas stream, in which the drying unit comprises first and second drying chambers, each containing an adsorbent material and each of which can be switched between online, offline and regeneration portions of an operating cycle, and in which the method includes the step of causing at least one of the chambers to switch from one of the portions of its operating cycle to another of the portions of its operating cycle dependent on (a) the moisture content of the gas stream in an outlet line from the first of the chambers operating in the online portion of the operating cycle while the second of the chambers is operating in its regenerating portion of the operating cycle, and (b) at least one of the ambient temperature and the temperature of the gas stream in an inlet line to the drying unit, and further in which, when the first one of the chambers is operating in the online portion of its operating cycle and the second one of the chambers is operating in the regenerating portion of its operating cycle, the method includes the steps of:
  a. switching the second chamber to an offline portion of its operating cycle in which it is isolated from both the gas stream in the inlet line and a purge gas stream from the online chamber, while maintaining the first chamber in the online portion of its operating cycle, in response to a determination at the end of the regenerating portion of the operating cycle of the second chamber that a suppression of the dewpoint of the gas stream in the outlet line relative to that of the gas stream in the inlet line is at least equal to a threshold value, and
  b. switching the second chamber to the online portion of its operating cycle and switching the first chamber to the regenerating portion of its operating cycle in response to a determination that the suppression of the dewpoint of the gas stream in the outlet line relative to that of the gas stream in the inlet line is less than a threshold value.

* * * * *